United States Patent
Ludger et al.

(10) Patent No.: US 6,805,554 B2
(45) Date of Patent: Oct. 19, 2004

(54) PLANT AND METHOD FOR THE PRODUCTION OF CEMENT CLINKER

(75) Inventors: Brentrup Ludger, Oelde (DE); Schmidthals Holger, Marietta, GA (US)

(73) Assignee: Polysius AG, Beckum (DE)

( * ) Notice: Subject to any disclaimer, the term of this patent is extended or adjusted under 35 U.S.C. 154(b) by 0 days.

(21) Appl. No.: 10/474,828

(22) PCT Filed: Jan. 23, 2002

(86) PCT No.: PCT/EP02/00658
§ 371 (c)(1),
(2), (4) Date: Nov. 4, 2003

(87) PCT Pub. No.: WO02/090283
PCT Pub. Date: Nov. 14, 2002

(65) Prior Publication Data
US 2004/0110107 A1 Jun. 10, 2004

(30) Foreign Application Priority Data
May 4, 2001 (DE) .......................... 101 21 773

(51) Int. Cl.[7] .............................. F27B 15/10

(52) U.S. Cl. ........................ 432/13; 432/58; 110/245

(58) Field of Search .................. 432/13, 58; 110/245, 110/345, 347; 48/197 R, 202, 203, 206, 210

(56) References Cited

U.S. PATENT DOCUMENTS

| 5,641,327 A | * | 6/1997 | Leas | .......................... 48/197 R |
| 5,707,230 A | * | 1/1998 | Kiss | .......................... 432/238 |
| 6,662,735 B2 | * | 12/2003 | Tischer et al. | .............. 110/342 |

FOREIGN PATENT DOCUMENTS

EP          0 764614 B1     1/2000

* cited by examiner

*Primary Examiner*—Gregory Wilson
(74) *Attorney, Agent, or Firm*—John K. McCulloch

(57) ABSTRACT

The invention relates to the production of cement clinker from cement raw material, wherein preheated raw material is calcined in a calcination zone, then finally burnt to cement clinker in a sintering combustion zone of a kiln supplied with fuel, and the hot cement is cooled in a cooler, and wherein fuel is generated from waste-derived fuels in a gasification reactor to which at least one gas conveying pipe for a reagent is connected and which is connected via at least one fuel gas pipe to at least one combustion zone. In order to increase the reaction rate of the lumpy waste-derived fuels and thus to achieve optimum fuel gas generation in the gasification reactor, a reagent introduction zone is constructed in the gasification reactor in the region above a solids bed made up of the waste-derived fuels, and reagent introduction connections uniformly distributed over the circumference of the reactor open into the reagent introduction zone in such a way that in the region of this introduction zone the reagent can be introduced with a high pulsation to create a pre-selected flow form.

13 Claims, 2 Drawing Sheets

PLANT AND METHOD FOR THE PRODUCTION OF CEMENT CLINKER

The invention relates to an apparatus (according to the preamble to claim 1) and to a method (according to the preamble to claim 17) for the production of cement clinker from cement raw material.

An apparatus and a method of the aforesaid type are known for example from EP 0 764 614 B1. In this known construction the gasification reactor is connected by its lower end directly to an exhaust gas pipe which leads to or contains the calcination zone, so that on the one hand the product gas generated in the reactor is introduced as combustion gas or fuel into the calcination zone and on the other hand the incompletely gasified residues of the waste-derived fuels gasified or degasified in the reactor are evacuated via the exhaust gas pipe into the kiln inlet. In the gasification reactor the lumpy waste-derived fuels, particularly scrap tyres, are gasified with tertiary air from the clinker cooler.

The object of the invention is make further improvements to apparatus according to the preamble to claim 1 as well as a method according to the preamble to claim 17 so that, by comparison with the known construction described above, all the speeds of conversion of the lumpy waste-derived fuels or secondary fuels, i.e. the progress of gasification of these waste-derived fuels, can be markedly increased with the most favourable dimensions possible of the reactor and the product gas which is generated can be used as fuel at various points in the cement production process.

This object is achieved according to the invention on the one hand—in relation to the apparatus—by the characterising features of claim 1 and on the other hand—in relation to the method of manufacture—by the characterising portion of claim 17.

Advantageous embodiments and further developments of the invention are the subject matter of the subordinate claims.

A first essential idea underlying the present invention is that in the gasification reactor in the region above a solids bed made up of the waste-derived fuels there is constructed a reagent introduction zone which extends over the reactor cross-section and into which reagent introduction connections which are regularly distributed over the circumference of the reactor open in such a way that in the region of the introduction zone the reagent can be introduced with a high pulsation to create a pre-selected flow form. Due to the gasification agent or reagent introduced in this way for instance in the form of branch streams with a high inlet pulse, in the region of the said introduction zone above the solids bed made up of the waste-derived fuels a favourable flow form (or flow pattern) is produced in such a way that the gasification reaction proceeds in a manner largely determined by the surface, which due to optimum setting of the said flow form (with the formation of a corresponding flow and temperature field) leads to a particularly high gasification efficiency. Thus particularly high conversion speeds of the lumpy waste-derived fuels can be brought about for the generation of the product gas to be exploited as combustible gas or fuel. This optimum progress of the gasification in the gasification reactor also brings with it the further advantage that the structural dimensions of the reactor used here can be kept relatively small.

In this construction according to the invention, furthermore, in a particularly advantageous manner the fuel gas pipe has associated with it at least one gas conveying arrangement for the supply of the fuel gas (product gas) generated in the gasification reactor to at least one combustion zone. In this connection it should already be pointed out that this apparatus according to the invention (and also the method according to the invention, which will be dealt with later) can generally be designed so that the calcination zone—as is known per se—can either be disposed as a separately constructed arrangement (calciner) in the region between the preheating zone or preheater and the kiln inlet or can be constructed in a first longitudinal section of the kiln designed as a rotary kiln, so that in the first case (separately constructed calcination arrangement) the calcination zone also simultaneously forms a further combustion zone and is supplied with fuel, via a separate fuel pipe or fuel gas branch pipe, whilst the sintering combustion zone contained in the kiln is supplied with fuel separately via its burner or main burner; by contrast, the apparatus contains only one single combustion zone, namely the sintering combustion zone referred to above, if the calcination zone is constructed in the first longitudinal section of the kiln (rotary kiln). Thus the optimally generated fuel gas can be used as fuel in various combustion zones (combustion sites).

According to an advantageous embodiment of the apparatus according to the invention, substantially all of the reagent introduction pipes open into the reagent introduction zone in the same horizontal plane, whereby for the formation of the predetermined flow form in the introduction zone the central axis of each introduction connection deviates downwards at an acute angle from a (radial) reference line directed to the centre of the reactor cross-section and/or from the said horizontal plane. Thus in the reagent introduction zone, above the solids bed made up of waste-derived fuels, a desired rotational flow is imposed upon the introduced reagent which has a positive influence on the material or heat transfer between the reagent and the waste-derived fuels.

In this construction according to the invention it is also advantageous if the horizontal plane in the gasification reactor defined by the orifices of the reagent introduction pipes is a predetermined clear vertical distance from the upper face of the solids bed, whereby it is advantageous if—for example as a function of the respective composition or type of the waste-derived fuels) this vertical distance can be adjusted or regulated within advantageous ranges.

According to a further advantageous embodiment of the invention it is advantageous if fans and/or injectors operated by means of compressed air or steam are provided as gas conveying arrangements in the gas supply pipe to the gasification reactor and in the fuel gas pipe. In this way on the one hand the flow pulse with which the reagent is introduced, preferably blown in, into the gasification reactor and on the other hand the supply of the generated fuel gas to at least one combustion site (in the calcination zone and/or the sintering combustion zone) can be optimally controlled.

The method according to the invention for the production of cement clinker is characterised above all in that in the gasification reactor above a solids bed made up of the waste-derived fuels the hot gaseous reagent is introduced at a plurality of supply sites distributed over the circumference of the reactor, forming a reagent introduction zone which extends over the reactor cross-section with a high pulsation and with a pre-selected flow form (flow pattern) and the fuel gas generated in the gasification reactor is supplied as fuel to the—at least one—combustion zone.

In this method according to the invention it is also particularly advantageous if the fuel gas generation in the gasification reactor is carried out under reducing conditions and the reactor is operated with an underpressure of at least 0.1 mbar. This prevents generated fuel gas from escaping in an undesirably manner out of the gasification reactor—apart from through the fuel gas pipe/pipes.

These and further details of the invention are explained in greater detail below with reference to the drawings, which have been kept largely schematic and in which.

Figure 1:
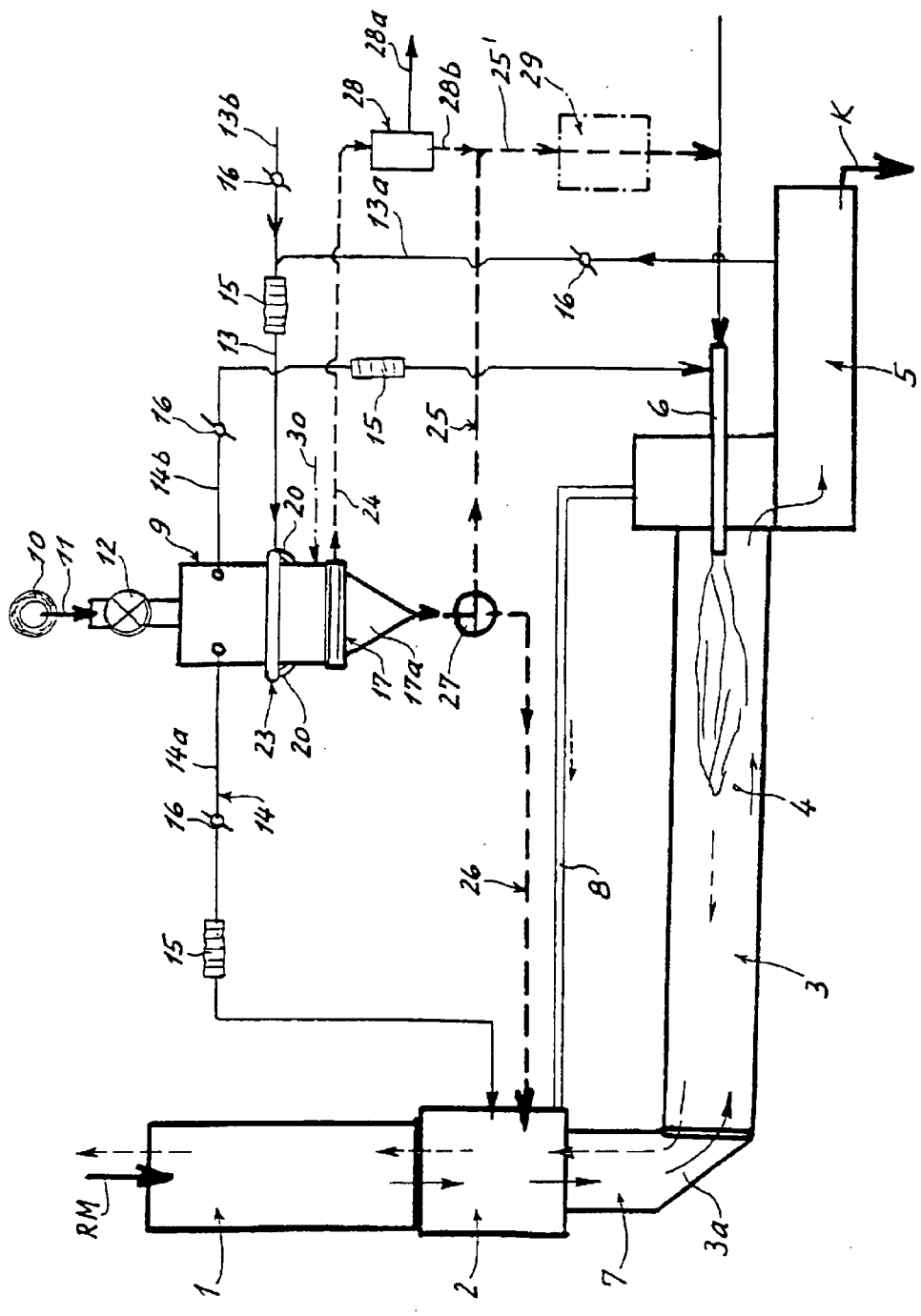
FIG. 1 shows a simplified diagram of an embodiment of the (overall) apparatus according to the invention.

The apparatus according to the invention for the production of cement clinker can to a large extent be constructed in a manner which is known per se. In the embodiment shown in the diagram according to FIG. 1, the apparatus contains in approximately the usual arrangement a preheater 1, particularly a gas suspension preheater, forming a preheating zone, a separately constructed calciner 2 disposed as calcination zone downstream of the preheater 1 in the flow direction of the cement raw material RM, a rotary kiln 3 as kiln, in which at least a sintering combustion zone 4 is formed, as well as a clinker cooler disposed as a cooling zone directly downstream of the rotary kiln 3.

These apparatus parts which are provided for the actual clinker burning process can be constructed in any suitable conventional manner and are connected to one another. In this case the preheater 1 and the calciner (calcination zone) form a pretreatment stage, whereby the cement raw material (arrow RM) to be burnt to cement clinker is fed in at the upper end of the preheater 1 and the preheated cement raw material is largely precalcined in the calciner 2 with the addition of fuel and combustion air, as is known per se. The material precalcined in this way is then introduced (according to the arrows shown by continuous lines) into the rotary kiln 3 via a kiln inlet (kiln inlet end) 3a of the latter, in which it is finally burnt to cement clinker in the sintering combustion stage 4 thereof, for which purpose this rotary kiln 4 is likewise supplied with fuel via its main burner 6. The finally burnt cement clinker (arrow K) is then cooled in the clinker cooler 5 by the delivery of cooling gas, particularly cooling air, and is drawn of from this cooler.

The rotary kiln 3 is connected via its kiln inlet 3a and a kiln exhaust gas pipe 7 adjoining it to the calciner 2, whilst the clinker cooler 5 communicates with the calciner 2 via a tertiary air pipe 8 in such a way that preheated exhaust air from the cooler is introduced as combustion air into the calciner 2 or into the calcination one formed thereby.

It should be added in this connection that, in a manner which is known per se and therefore is not described in detail, fuel gas flowing off out of the rotary kiln 3 or out of the sintering combustion zone 4 thereof is led off via the kiln exhaust gas pipe 7 and the calciner 2 and through the preheater 1 (according to the arrows indicated by broken lines).

This apparatus for the production of cement clinker further includes a gasification reactor 9 for the generation of fuel gas from lumpy waste-derived fuels, which are above all large lumps of waste products, particularly whole or coarsely comminuted scrap tyres, but optionally also other coarsely comminuted waste-derived fuels such as wood and the like. In FIG. 1 it may be assumed that—as preferred—scrap tyres 10 are fed in according to the arrow 11 via a suitable feed gate 12, particularly an air-tight rotary gate or flap valve gate. On the one hand, at least one gas feed supply 13 for supplying a hot gaseous reagent or gasification agent is connected to this gasification reactor 9, whilst on the other hand the gasification reactor 9 is connected via at least one fuel gas pipe 14 to the two combustion zones (2, 3) provided in this embodiment, i.e. the fuel gas pipe 14 is formed here by two fuel gas pipes or—better expressed—by two fuel gas branch pipes 14a and 14b, of which one branch pipe 14a is connected to the calciner (calcination zone) 2 (as a combustion zone) and the other branch pipe 14b is connected to the main burner of the sintering combustion zone 4 formed in the rotary kiln 3 (as second combustion zone). In this way fuel gas generated in the reactor 9 can be supplied as fuel to these two combustion sites or combustion zones (2, 4) in the particular manner necessary, i.e. proportionally or selectively. It should also be mentioned at this point that instead of the two individual fuel gas pipes 14a and 14b leading off from the gasification reactor 9, naturally it is also possible for one single fuel gas pipe to lead off therefrom, and this could then be branched in a suitable manner into two or more corresponding branch pipes.

In each of these fuel gas pipes 14a, 14b there is disposed at least one gas conveying arrangement which can be formed in each case by a suitable fan or an injector operated by means of compressed gas (e.g. compressed air) or steam, in order to be able to introduce the generated fuel gas in the necessary manner (pressure and speed) into the appertaining combustion zone; in the example of the apparatus according to FIG. 1 injectors 15 are indicated.

Furthermore, in the fuel lines 14a, 14b there are provided means for measuring and regulating the quantity of fuel gas which are indicated at 1 and can be individually controlled—for example via a central switching and control arrangement—so that generated fuel gas from the gasification reactor 9 can be conveyed either only to the calciner 2 or only to the main burner 6 of the sintering combustion zone 4 or in adjustable proportions partially to the calciner 2 and partially to the sintering combustion zone 4.

The gas supply line 13 coming to the gasification reactor 9 can be a simple fresh air pipe for supplying fresh air or an exhaust air pipe from the cooler for supplying hot exhaust air from he cooler or—as indicated in FIG. 1—a combination of the previously mentioned types of pipes, i.e. according to FIG. 1 hot exhaust air from the clinker cooler 5 can be introduced into the gasification reactor 9 via a first branch pipe 13a and fresh air can be introduced via a second branch pipe 13b. In this case a suitable gas conveying arrangement, which again may be a suitable fan or an injector operated by means of compressed gas or steam (similar to the fuel gas pipes), is also advantageously connected into the gas supply pipe 13; and here too suitable means 16 are disposed in the branch pipes 13a and 13b for measuring and regulating the quantities of gas.

Figure 2:
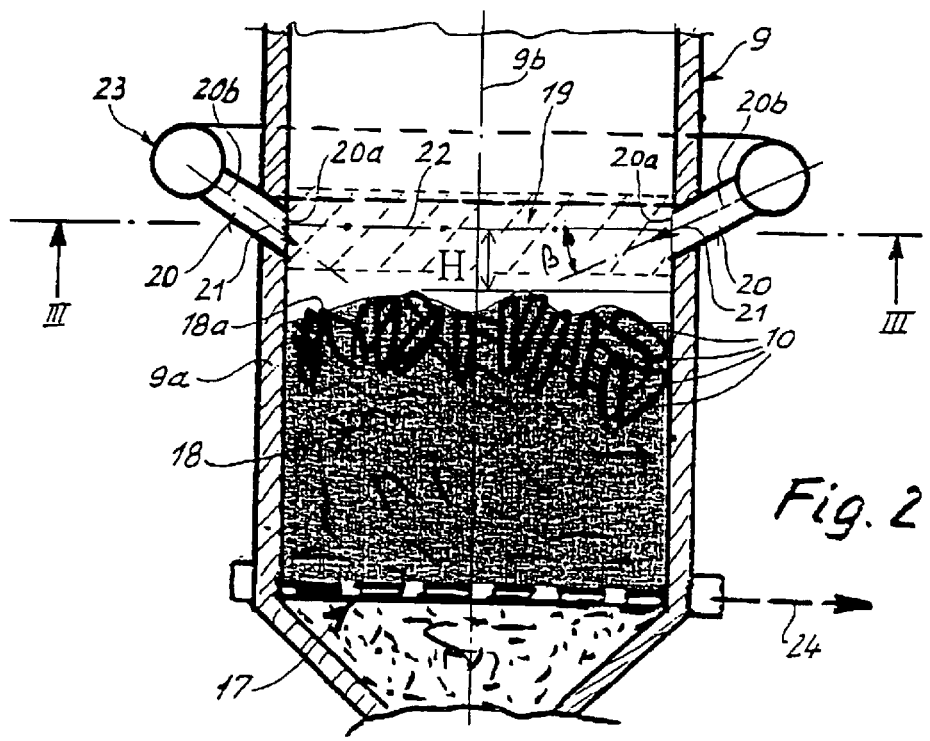
FIG. 2 shows a partial vertical sectional view through a gasification reactor used according to the invention.
Figure 3:
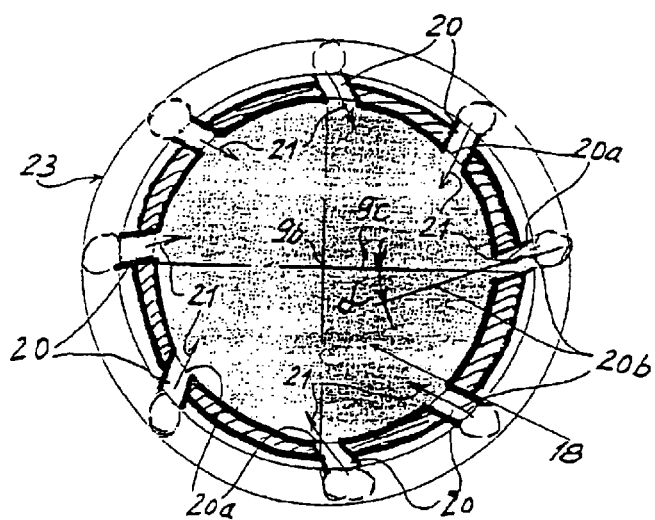
FIG. 3 shows a cross-sectional view through this gasification reactor, approximately corresponding to the section line III—III in FIG. 2 (with an approximately circular reactor cross-section)

The gasification reactor 9 is—as can also be seen from the representations in FIGS. 2 and 3—constructed in the form of a substantially vertical reaction or gasification shaft which is provided with the aforementioned upper feed gate 12 for the waste-derived fuel 10 and also with a discharge device 17 provided in the base region for incompletely gasified residues. According to the representation in FIGS. 2 and 3 the shaft 9a of the gasification reactor 9 is constructed with a round cross-section, in this case circular cross-section.

Figure 4:
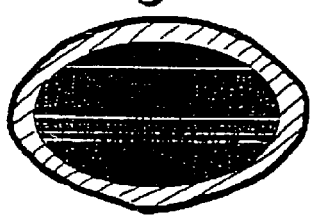
FIGS. 4, 5 and 6 show cross-sectional views of further possible cross-sectional shapes of the gasification reactor.
Figure 5:
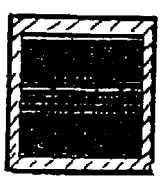
Figure 6:
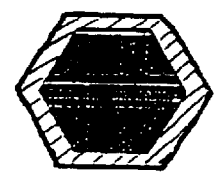
Figure 2:
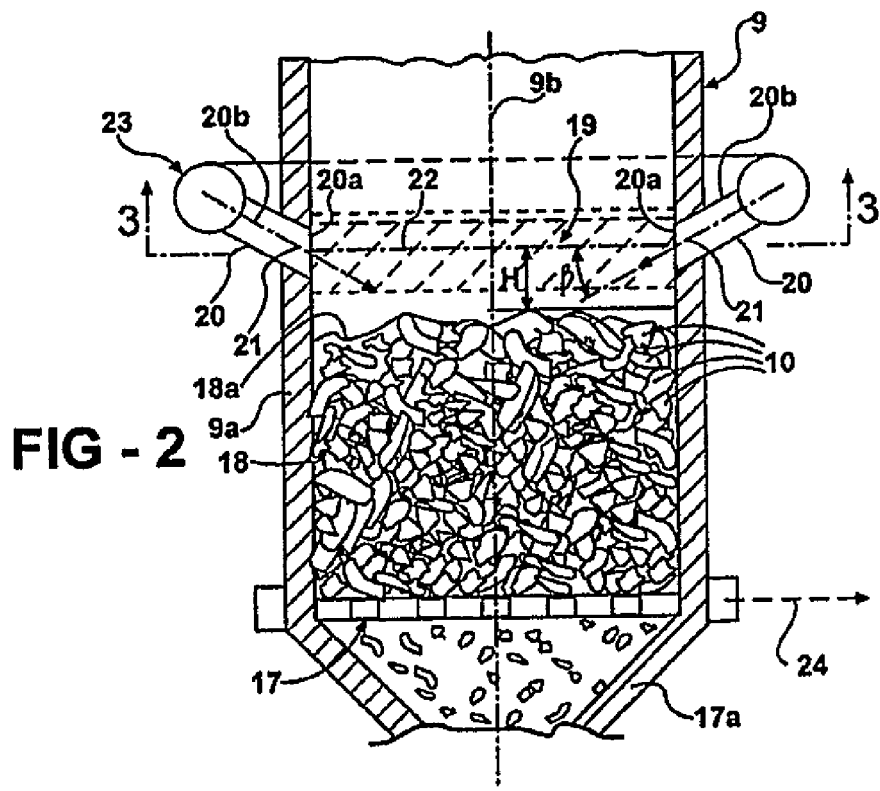
Figure 3:
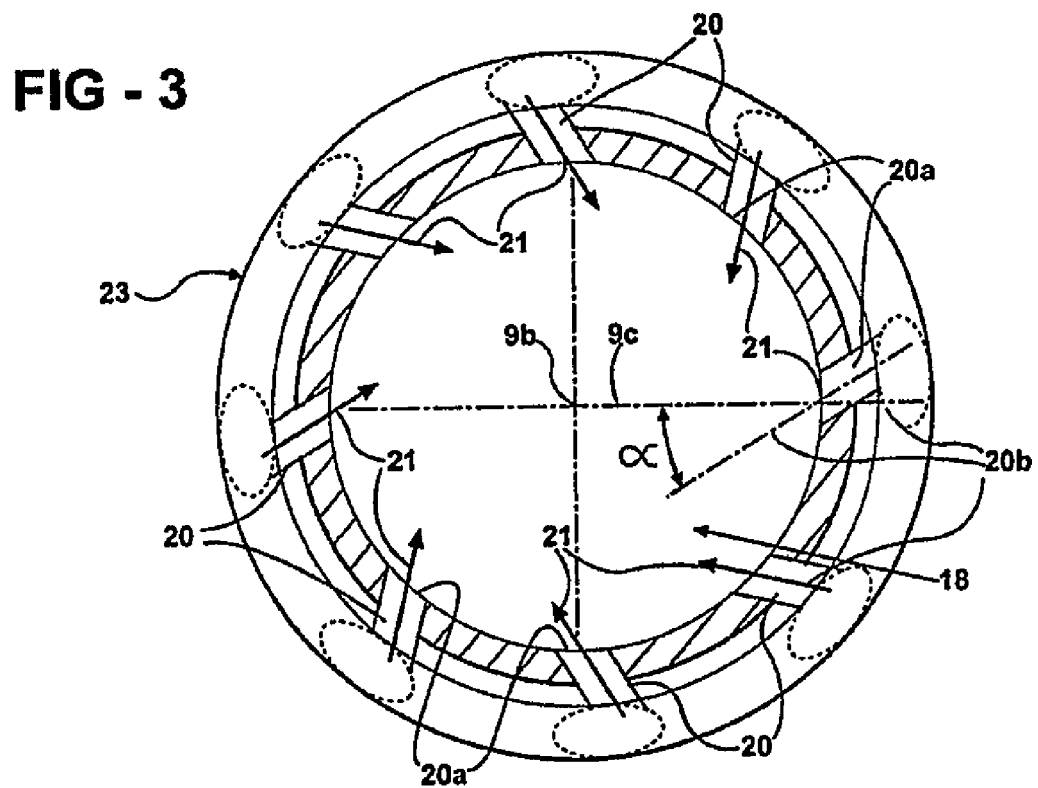
Figure 4:
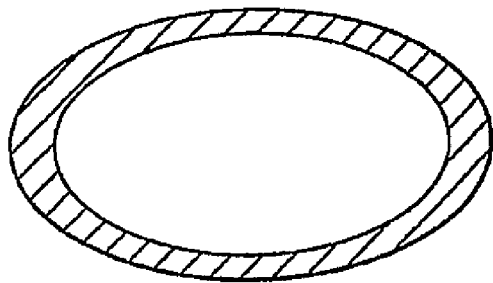
Figure 5:
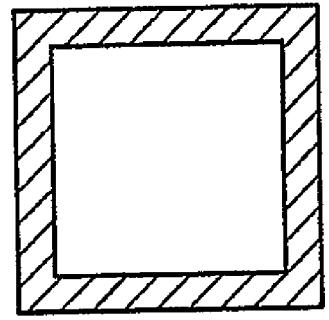
Figure 6:
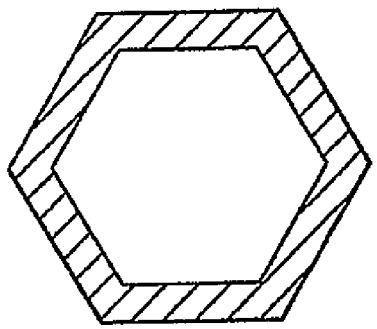

It should be pointed out at this point that the shaft 9a of the gasification reactor 9 can have any other suitable cross-sectional shape. FIGS. 4, 5 and 6 show examples thereof in simplified cross-sectional form, i.e. FIG. 4 shows a somewhat elliptical cross-sectional shape, FIG. 5 shows a somewhat square cross-sectional shape and FIG. 6 shows a polygonal (in this case hexagonal) cross-sectional shape of the reactor shaft 9a.

In this construction according to the invention the supply or introduction of the gaseous reagent (gasification agent) from the gas supply pipe 13 into the reactor shaft 9a is of particular importance. In this connection, apart from the representation in FIG. 1 attention is drawn above all to the representations in FIGS. 2 and 3.

In FIG. 2 it can be seen that in the gasification reactor 9 or in the reactor shaft 9a thereof a solids bed 18 is formed which is made up of the waste-derived fuels 10 (in this case preferably the scrap tyres 10) and extends over a corresponding height in the reactor shaft 9a. Above this solids bed 18 or above the upper face 18a of this solids bed 18—which is more or less irregular depending upon the type of waste-derived fuels/scrap tyres 10—there is also formed a reagent injection zone or introduction zone 19 which extends over the entire reactor cross-section and into which reagent injection or introduction connections 20 which are uniformly distributed over the circumference of the reactor open in such a way that in the region of the introduction zone 19 the gaseous reagent (arrow 21) can be introduced with a high pulsation, creating a pre-selected flow form.

As can be seen in FIG. 2, substantially all of the reagent introduction connections 20 open into the reagent introduction zone 19 in the same horizontal plane, i.e. this horizontal plane 22 is substantially defined by the orifices 20a, and more precisely—as can be seen in FIG. 2—by the centres of these orifices 20a, these centres in turn being determined by the central axes 20b of the introduction connections 20. Accordingly the more or less thick reagent introduction zone 19 is formed in the region above and below this horizontal plane 22.

In order to be able to create the desired or pre-selected flow form of the introduced reagent in the introduction zone 19, the reagent introduction connections 20 are connected with a specific orientation to the shaft 9a of the gasification reactor 9: The central axis 20b of each introduction connection 20 diverges downwards at an acute angle from a reference line 9c (cf. angle $\alpha$ in FIG. 3) directed to the centre 9b of the reactor cross-section—and radial in this case—and also simultaneously—in this embodiment—from the horizontal plane 22 (angle $\beta$ in FIG. 2). This produces a particularly distinct flow pattern with a marked rotational flow in the region of the reagent introduction zone 19. The desired high pulsation with which the reagent (arrows 21) is introduced into the reactor shaft 9a or into the introduction zone 19 formed therein can be controlled in particular by way of the gas conveying arrangement (e.g. injectors 15) as well as the measuring and regulating means 16 in the gas pipes 13a, 13b. In this case it is also particularly advantageous if—as indicated in FIG. 2—the horizontal plane 22 in the gasification reactor 9 is a predetermined vertical distance H from the upper face 18a of the solids bed 18.

As has already been indicated above, in the illustrated embodiment (FIG. 1) the gas supply pipe 13 (for the reagent) is formed by a kind of combination of a first branch pipe 13a carrying oxygen-containing exhaust air from the cooler (tertiary air) and constructed as a pipe for exhaust air from the cooler or a tertiary air pipe and a fresh air pipe carrying oxygen-containing air (fresh air), namely the second branch pipe 13b.

This type and supply of reagent in the gasification reactor 9 results in substantially the following spatial relationship between the solids bed (in this case the bed of tyres) 18 and the reagent supply in the region of the introduction zone 19: The gaseous reagent flows—according to the arrows 21—with a high pulsation into the reactor shaft 9a, i.e. it flows in the form of part-streams (arrows 21) into the reagent introduction zone 19 and there—that is to say above the upper face 18a of the solids bed—exhibits the pre-selected flow form (flow pattern). As a result a reaction which is predominantly determined by the surface takes place with the waste-derived fuels (scrap tyres) in the solids bed 18. Consequently the total reaction rate, i.e. the way and how quickly and effectively the gasification of the fuel proceeds, depends considerably upon the heat and matter transfer coefficient achieved on the surface or the upper face 18a of the solids bed 18. The homogeneity of the distribution of flow and heat in the region of the upper face 18a of the solids bed is an index for the quality of this surface reaction and thus for the fuel gas generation. Accordingly care should be taken to ensure that an optimum vertical distance H is maintained between the horizontal plane 22, and thus also the reagent introduction zone 19 formed in this region, and the upper face 18a of the solids bed 18. Thus this homogeneity of the distribution of flow and heat in the region of the upper face 18a of the solids bed is to some extent an index for the quality of the desired surface reaction. Therefore it is advantageous if the said vertical distance H, as will be explained in somewhat greater detail below, can be set to the most favourable value. At a specific vertical distance H, advantageously guided by a control circuit, between the surface (upper face 18a) of the solids bed and the plane of the inlet for the gasification agent (horizontal plane 22) an optimum overall picture of the flow and temperature field is achieved. In the case of a solids bed 18 which is too low, i.e. with a vertical distance H which is too great, the turbulence on the upper face 18a of the solids bed is too little, so that the transfer of matter and heat becomes poorer, and this negative effect is reinforced by the insulating effect of gas layer which forms with a high soot content. On the other hand, with a solids bed 18 which is too high, i.e. with a vertical distance H which is too little, the creation of the desired flow form (flow pattern) is prevented because the fuel reaches the immediate vicinity of the reagent inlets, that is to say the reagent introduction connections 20 and deflects the incoming reagent streams so that only part-regions of the surface of the solids bed are actively brought into contact with the reagent. As a result, whilst the conversion rate is increased at some points, that is to say locally, overall however it is undesirably reduced. Thus the aforementioned clear vertical distance H, that is to say on the one hand a minimum and on the other hand a maximum vertical distance, should be maintained.

In so far as the construction of the gasification reactor 9 is concerned, reference may be made again in particular to FIGS. 2 and 3. In these drawings—and to some extent also in FIG. 1—it can be seen that the gasification agent introduction connections 20 are connected to a common ring pipe 23 which surrounds the gasification reactor 9 or—more precisely—the reactor shaft 9a thereof and to which in turn the previously explained gas supply pipe 13 for the reagent is connected. It should again be mentioned at this point that in the previously explained embodiment of the apparatus and the gasification reactor 9 the reagent is—because of the design of the apparatus—blown into the introduction zone 19 via the introduction connections 20, but this blowing in can be assisted by underpressure in the reactor 9 (combination of underpressure and overpressure), or this introduction can take place substantially by underpressure or suction.

The above-mentioned residue discharge device 17 of the gasification reactor 9 can be constructed in any suitable manner, particularly as a controllable mechanical discharge device. In this case it is important above all that the discharge capacity of this discharge device 17 is controllable with a view to regulating the vertical distance H between the surface 18a of the solids bed 18 and the horizontal plane 22 containing the orifices 20a of the introduction connection 20. The measuring and control arrangements are sufficiently well known in the art, so they do not need to be explained in detail here.

Of the residues leaving the gasification reactor 9 downwards through the discharge device 17, at least the combustible constituents are advantageously conveyed to at least one of the combustion sites or combustions zones. Accordingly an outlet hopper 17a is provided below the residue discharge device 17 and is connected to at least one combustion zone 2, 4—as indicated by heavy broken lines in FIG. 1—via at least one suitable conveying arrangement. In the embodiment of the apparatus illustrated in FIG. 1 two conveying arrangements 25 and 26 are indicated, of which the conveying arrangement 25 is connected to the main burner 6 of the sintering zone 4, whilst the conveying arrangement 26 is connected to the calciner 2, that is to say to the calcination zone. In this way a proportion of the combustible residue can, if need be, be conveyed via the conveying arrangement 25 into the sintering zone of the rotary kiln 3 and at least a proportion of the combustible residue can, if need be, be conveyed via the conveying arrangement 26 into the calcination zone (calciner 2). For this purpose a suitable distribution or branching arrangement 27 is provided below the outlet hopper 17a.

Since the degasified or gasified waste-derived fuels are present at the lower end of the gasification reactor 9, i.e. when they leave this reactor in the form of residues which still contain a proportion of combustion residues and a proportion of non-combustible residues, it is advantageous if the residue discharge device 17 is constructed not only as a simple controllable discharge device but simultaneously also as a separating arrangement for separating off the non-combustible residue constituents from the combustible residues. This can take place for example by the non-combustible residue constituents, e.g. wires (from scrap tyres), metal parts or the like, being drawn off approximately in the region of the upper face of the discharge device 17, separate removal means being advantageously associated with this discharge device 17, as indicated in FIGS. 1 and 2 by thick broken lines 24. These removal means for the non-combustible residue constituents are advantageously connected to an after-treatment arrangement 28 which for its part is connected via a first discharge pipe 28a to any suitable disposal means and via a second discharge pipe 28b to at least one combustion zone, for example the sintering combustion zone 4 (above the main burner 6) of the apparatus. In this after-treatment arrangement 28, parts (e.g. soot particles, etc.) which are combustible or can be exploited in some other way in the combustion apparatus and are still adhering to the non-combustible constituents can be removed by mechanical, thermal and/or chemical means, so that only the fractions which are not exploitable in the cement clinker production have to be disposed of via the discharge pipe 28, whilst the combustible parts which can still be exploited can be supplied via the second discharge pipe 28b to the main burner 6 and thus to the sintering combustion zone 4. This latter can advantageously be achieved by bringing together the conveying arrangement 25 running from the outlet hopper 17a to the main burner 6 and the second discharge pipe 28b of the after-treatment arrangement 28—for example in a common conveying arrangement 25' (FIG. 1)—and bringing them both together—in this conveying arrangement 25'—to the main burner 6 of the combustion zone.

It is frequently advantageous if the residues from the gasification reactor 9 which are to be delivered to the main burner 6 can still be cooled to a suitable temperature. For this reason it may be advantageous to provide a suitable cooling arrangement, preferably an indirectly acting cooler 29 (as indicated by dash-dot lines in FIG. 1), via or through which the common conveying arrangement 25', i.e. the bringing together of the conveying arrangement 25 of the discharge device 17 and the second discharge pipe 28b of the after-treatment arrangement 28, is passed so that the combustible residues conveyed therein can first of all be appropriately cooled before they are delivered to the main burner 6.

As has already been mentioned above, the apparatus according to the invention can be constructed not only in the manner already described with reference to FIG. 1 with a separately constructed calciner 2 disposed in the region between the preheater 1 and the rotary kiln outlet 3a, but it is also equally possible in terms of apparatus and also of method to construct the calcination zone in the first longitudinal section of the rotary kiln 3 and accordingly to dispose the preheater 1 or the preheating zone formed thereby directly before the rotary kiln inlet 3a. This embodiment of the apparatus, which is modified somewhat relative to FIG. 1 and is known per se, is readily understood and therefore does not need to be illustrated separately in the drawings. In this second embodiment (calcination zone at the start of the rotary kiln) there is only one single combustion zone, namely the sintering combustion zone 4, which must be supplied from the gasification reactor 9 with fuel gas (as product gas). In this case nothing changes with regard to the construction, function and mode of operation of the gasification reactor 9 which is constructed and used according to the invention.

In addition to or in combination with at least some of the features and provisions described above, there are yet further possibilities for the design of the previously described apparatus according to the invention or the method according to the invention which is to be carried out using the apparatus.

Thus it is particularly advantageous if the fuel gas generation is carried out in the gasification reactor 9 under reducing conditions, that is to say in a sub-stoichiometric mode of operation. In this case this reactor 9 is advantageously operated at a slight underpressure of at least approximately 0.1 mbar.

As has already been explained above from the design point of view—with reference to FIGS. 2 and 3—the connections 20 for introduction of reducing agent are oriented so that their central axes 20b each diverge downwards at an acute angle ($\alpha$ or $\beta$) from a reference line 9c directed to the centre of the shaft 9b and/or from the horizontal plane 22. Accordingly the reagent (gasification agent) is blown into the reagent introduction zone 19 of the reactor 9 in the form of pulsed jets, the flow direction of which is oriented at the said acute angles $\alpha$ or $\beta$ obliquely towards the centre of the reactor or downwards. These pulsed streams of the reagent to be delivered to the gasification reactor 9 or to the reagent introduction zone 19 thereof and/or of the fuel gas to be delivered to the combustion zones (calcination zone 2 and sintering combustion zone 4) from the exhaust gas reactor 9 are advantageously set to a flow speed of at least 20 m/s, based on the operating state of the gases, with the gas conveying arrangements (fans or injectors 15) explained above interposed.

The reaction rate, which has also already been addressed above, in the reaction or gasification of the waste-derived fuels can be further improved in a favourable manner by introducing or spraying fluids, particularly water, into the gaseous reagent, in order thereby to accelerate the reaction speed in the gasification reactor. This spraying in of fluids can for example take place in the region just before the blowing in of the reagent into the introduction zone 19 or in the inlet region of the introduction zone 19 within the reactor 9.

Furthermore, it may be favourable likewise to supply fluids, preferably water, to the product gas or fuel gas generated in the gasification reactor 9, in order to assist or to promote any consequent reactions with hydrocarbon compounds and/or soot in the fuel gases.

A further possibility for increasing the aforementioned reaction rate of the waste-derived fuel and thus the gasification effect can be achieved by introducing a relatively small branch-stream of the gaseous reagent into the solids bed 18 in the lower region of the gasification reactor 9. This possibility is indicated in FIG. 1 on the gasification reactor 9 by an arrow 30 shown by a dash-dot line. However, this means that in any case the significantly larger main quantity of the gaseous reagent is introduced, preferably blown in, via the pipe 13 and the ring pipe 23 as well as the introduction connection 20 into the reactor 9, and indeed into the reagent introduction zone 19 constructed above the upper face of the solids bed.

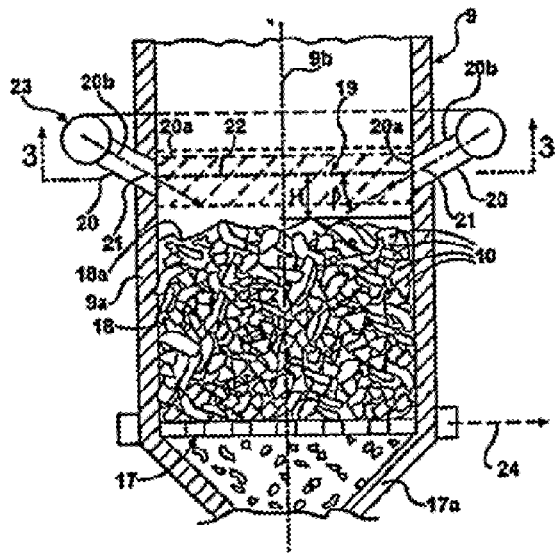

What is claimed is:

1. Apparatus for the production of cement clinker from cement raw material (RM), with a preheating zone (19), a calcination zone (2), a sintering combustion zone (4) for final burning of the cement clinker and a cooler (5) for cooling of the hot cement clinker by means of cooling gas, wherein at least the sintering combustion zone (4) formed in a kiln (3) is supplied via a burner (6) with fuel, and also with a gasification reactor (9) which is designed for generation of fuel gas from lumpy waste-derived fuels (10), such as e.g. scrap tyres, wood and the like, and to which on the one hand at least one gas supply pipe (13) for a gaseous reagent is connected and which on the other hand is connected via at least one fuel gas pipe (14) to at least one combustion zone (2, 4), characterised by the following features:

a) in the gasification reactor (9) in the region above a solids bed (18) made up of the waste-derived fuels (10) there is constructed a reagent introduction zone (19) which extends over the reactor cross-section and into which reagent introduction connections (20) which are regularly distributed over the circumference of the reactor open in such a way that in the region of the introduction zone (19) the reagent (21) can be introduced with a high pulsation to create a pre-selected flow form;

b) the fuel gas pipe (14, 14a, 14b) has associated with it at least one gas conveying arrangement (15) for the supply of the fuel gas generated in the gasification reactor (9) to at least one combustion zone (2, 4).

2. Apparatus as claimed in claim 1, characterised in that substantially all of the reagent introduction pipes (20) open into the reagent introduction zone (19) in the same horizontal plane (22), whereby for the formation of the predetermined flow form in this introduction zone (19) the central axis (20b) of each introduction connection (20) deviates downwards at an acute angle ($\alpha$ or $\beta$) from a reference line (9c) directed to the centre (9b) of the reactor cross-section and/or from the said horizontal plane (22).

3. Apparatus as claimed in claim 1, characterised in that the gasification agent introduction connections (20) are connected to a common ring pipe (23) which surrounds the gasification reactor (9) and to which in turn the gas supply pipe (13) provided with a gas conveying arrangement (15) for the gasification agent is connected.

4. Apparatus as claimed in claim 3, characterised in that the gas supply pipe (13) is formed by a pipe (13a) which conveys oxygen-containing exhaust air from the cooler and/or by a fresh air pipe (13b) conveying oxygen-containing air.

5. Method of production of cement clinker from cement raw material, wherein the cement raw material (RM) is first of all preheated in a preheating zone (1), then calcined in a calcination zone (2) and afterwards finally burnt to cement clinker in a sintering combustion zone (4) with fuel being supplied, whereupon the hot cement clinker is cooled in a cooling zone (5) with the aid of cooling gas, and wherein in a gasification reactor (9) a fuel gas is generated from lumpy waste-derived fuels (10), such as e.g. scrap tyres, wood or the like, with a gaseous reagent being supplied, this fuel gas being exploited as fuel in at least one combustion zone (2, 4), characterised in that in the gasification reactor (9) above a solids bed (18) made up of the waste-derived fuels (10) the hot gaseous reagent (21) is introduced at a plurality of supply sites (20, 20a) distributed over the circumference of the reactor, forming a reagent introduction zone (19) which extends over the reactor cross-section with a high pulsation and with a pre-selected flow form (flow pattern) and the fuel gas generated in the gasification reactor (9) is supplied as fuel to the combustion zone (2, 4).

6. Method as claimed in claim 5, characterised in that the fuel gas generation in the gasification reactor (9) is carried out under reducing conditions and this reactor (9) is operated with an underpressure of at least 0.1 mbar.

7. Method as claimed in claim 5, characterised in that the reagent is introduced into the reagent introduction zone (19) n the form of part-streams with a high inlet pulse, of which the inflow direction in each case diverges downwards at an acute angle ($\alpha$, $\beta$) from a reference line directed to the centre of the reactor and/or from the horizontal (22), forming a rotational flow with respect to the horizontal plane (22) defined by the introduction sites (20, 20a).

8. Method as claimed in claim 5, characterised in that fluids which accelerate the reaction speed in the gasification reactor (9) are sprayed into the gaseous reagent.

9. Method as claimed in claim 5, characterised in that fluids are supplied to the fuel gas generated in the gasification reactor (9) to promote consequent reactions with hydrocarbon compounds and/or soot contained in the fuel gas.

10. Method as claimed in claim 5, characterised in that in order to increase the reaction rate of the waste-derived fuel a relatively small part-stream (30) of the gaseous reagent is introduced into solids bed (18) in the lower region of the gasification reactor (9).

11. Method as claimed in claim 5, characterised in that at least a proportion of the combustible constituents of the residues leaving the gasification reactor is delivered to at least one combustion zone (2, 4).

12. Method as claimed in claim 11, characterised in that after the gasification reactor (9) the residues are separated at least into combustible constituents and non-combustible constituents, such as e.g. metal residues.

13. Method as claimed in claim 12, characterised in that at least a proportion of the residues leaving the gasification reactor (9) is cooled.

* * * * *

UNITED STATES PATENT AND TRADEMARK OFFICE
CERTIFICATE OF CORRECTION

| | |
|---|---|
| PATENT NO. | : 6,805,554 B2 |
| APPLICATION NO. | : 10/474828 |
| DATED | : October 19, 2004 |
| INVENTOR(S) | : Ludger Brentrup |

It is certified that error appears in the above-identified patent and that said Letters Patent is hereby corrected as shown below:

Delete Title Page showing an illustrative figure and, substitute the attached Title Page.

Delete Sheet 2 of 2 containing figures 2-6, and substitute the accompanying Figures 2-6 for the corresponding figures of the patent.

Signed and Sealed this

Twenty-eighth Day of August, 2007

JON W. DUDAS
*Director of the United States Patent and Trademark Office*

(12) United States Patent
Ludger et al.

(10) Patent No.: US 6,805,554 B2
(45) Date of Patent: Oct. 19, 2004

(54) PLANT AND METHOD FOR THE PRODUCTION OF CEMENT CLINKER

(75) Inventors: Brentrup Ludger, Oelde (DE); Schmidthals Holger, Marietta, GA (US)

(73) Assignee: Polysius AG, Beckum (DE)

(*) Notice: Subject to any disclaimer, the term of this patent is extended or adjusted under 35 U.S.C. 154(b) by 0 days.

(21) Appl. No.: 10/474,828
(22) PCT Filed: Jan. 23, 2002
(86) PCT No.: PCT/EP02/00658
§ 371 (c)(1),
(2), (4) Date: Nov. 4, 2003
(87) PCT Pub. No.: WO02/090283
PCT Pub. Date: Nov. 14, 2002

(65) Prior Publication Data
US 2004/0110107 A1 Jun. 10, 2004

(30) Foreign Application Priority Data
May 4, 2001 (DE) ........................ 101 21 773

(51) Int. Cl.⁷ .................................. F27B 15/10
(52) U.S. Cl. ................. 432/13; 432/58; 110/245
(58) Field of Search ............... 432/13, 58; 110/245, 110/345, 347; 48/197 R, 202, 203, 206, 210

(56) References Cited
U.S. PATENT DOCUMENTS 5,641,327 A * 6/1997 Leas ................. 48/197 R
5,707,230 A * 1/1998 Kiss ................. 432/238
6,662,735 B2 * 12/2003 Tischer et al. ........ 110/342

FOREIGN PATENT DOCUMENTS
EP        0 764 614 B1    1/2000

* cited by examiner

Primary Examiner—Gregory Wilson
(74) Attorney, Agent, or Firm—John K. McCulloch

(57) ABSTRACT

The invention relates to the production of cement clinker from cement raw material, wherein preheated raw material is calcined in a calcination zone, then finally burnt to cement clinker in a sintering combustion zone of a kiln supplied with fuel, and the hot cement is cooled in a cooler, and wherein fuel is generated from waste-derived fuels in a gasification reactor to which at least one gas conveying pipe for a reagent is connected and which is connected via at least one fuel gas pipe to at least one combustion zone. In order to increase the reaction rate of the lumpy waste-derived fuels and thus to achieve optimum fuel gas generation in the gasification reactor, a reagent introduction zone is constructed in the gasification reactor in the region above a solids bed made up of the waste-derived fuels, and reagent introduction connections uniformly distributed over the circumference of the reactor open into the reagent introduction zone in such a way that in the region of this introduction zone the reagent can be introduced with a high pulsation to create a pre-selected flow form.

13 Claims, 2 Drawing Sheets